Aug. 14, 1928.
A. J. KERCHER ET AL
1,680,622
ELECTRIC WATER HEATER
Filed June 28, 1926
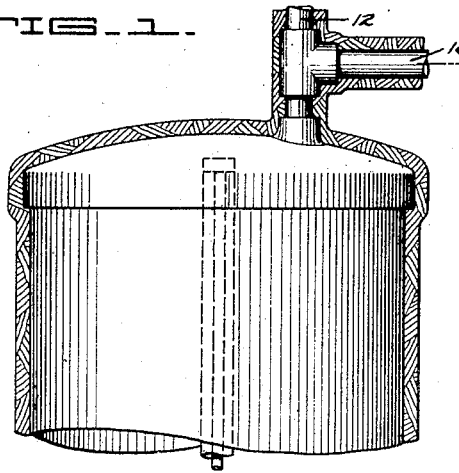
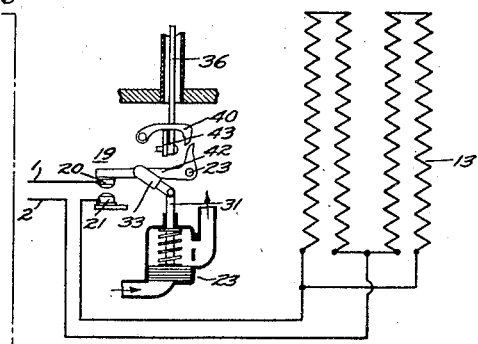
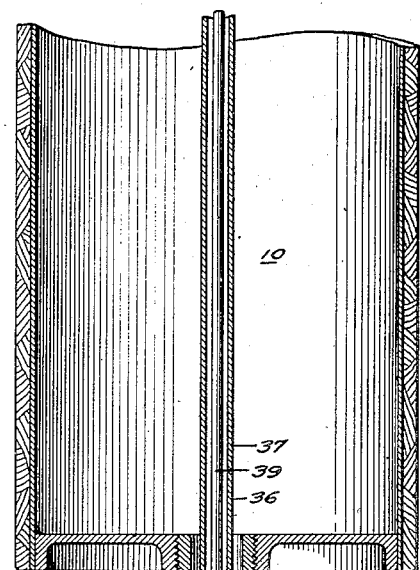
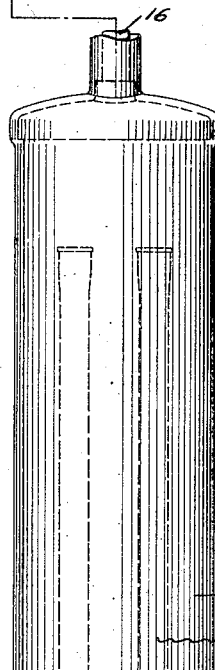
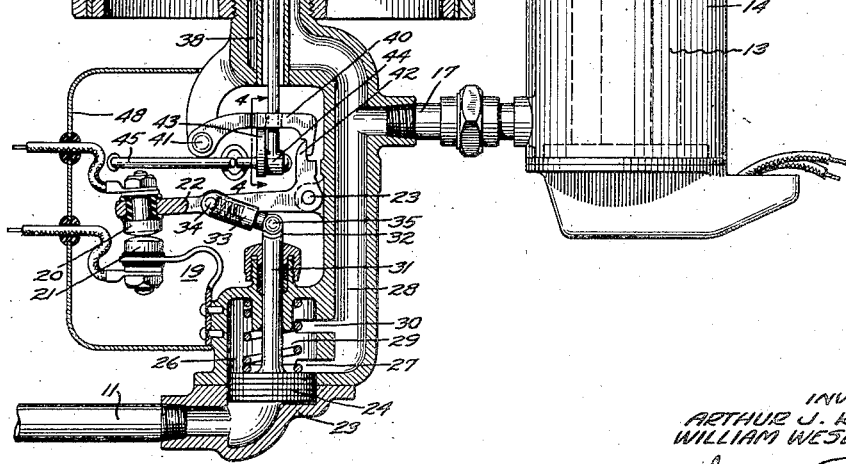
INVENTORS:
ARTHUR J. KERCHER
WILLIAM WESLEY HICKS
by White Prost
their ATTORNEYS Patented Aug. 14, 1928.

1,680,622

UNITED STATES PATENT OFFICE.

ARTHUR J. KERCHER, OF BERKELEY, AND WILLIAM WESLEY HICKS, OF SAN FRANCISCO, CALIFORNIA.

ELECTRIC WATER HEATER.

Application filed June 28, 1926. Serial No. 118,909.

This invention relates generally to electrical liquid heating devices especially adapted for use with household water supply systems.

Household water heaters usually comprise a storage tank associated with electrical heating elements whereby hot liquid may be stored in the tank to be subsequently withdrawn through faucets or other such devices. It is common to control the current supplied to the heating elements by means of a thermostat element operable to interrupt the current when the tank becomes filled with hot liquid. However, for household purposes a full tank of hot water is seldom required and much current is wasted by permitting the storage of a full tank before causing the current to be interrupted.

It is an object of this invention to devise a thermostatic control for electrical liquid heaters which may be manually adjusted to interrupt the current after the heating of a predetermined quantity of water.

It is a further object of this invention to devise a thermostatic element especially adapted to be used in combination with a heater in which the electrical heating element is energized upon flow of water through the system.

Further objects of the invention will appear from the following description in which we have set forth the preferred embodiment of our invention. It is to be understood that the scope of the invention is to be determined from the appended claims and the state of the prior art.

Referring to the drawings:

Figure 1 is a cross sectional elevational view showing a liquid heater incorporating the principles of this invention.

Fig. 2 is a detail showing the manual thermostat adjustment.

Fig. 3 is a circuit diagram illustrating the operation of the device.

Fig. 4 is a cross sectional detail taken along the line 4—4 of Fig. 1.

The principles of this invention have been incorporated with a liquid heater of the type shown and described in our co-pending application for electric water heater. Such a heater comprises generally an electric switch for controlling the current supplied to the electrical heating elements, the switch being moved to closed position in response to flow of liquid through the system and being caused to move to open position by a thermostat element. In this invention the thermostat element has been extended the full height of the storage tank and is provided with an adjustable connection to the switch whereby it may be manually controlled to cause the current to the heating elements to be interrupted after a predetermined quantity of water has been heated.

Referring to the drawings, there is shown a conventional type of liquid storage tank 10 having its lower portion in engagement with an intake pipe 11 which communicates with a source of cold liquid, and having its upper portion communicating with an outlet pipe 12 supplying faucets or other such devices. Associated with the tank 10 is an electrical heating element 13 which is preferably placed external of the tank 10 within an auxiliary reservoir 14. The reservoir 14 has its upper and lower portions in communication with the upper and lower portions of the tank 10 respectively through pipes 16 and 17 whereby a thermal circulation may be induced between the tank 10 and reservoir 14. With such an arrangement when the electrical heating element 13 is energized, heated liquid from the reservoir 14 will be stored in the upper portion of the tank 10 while cold liquid from the tank 10 will be drawn into the lower portion of the reservoir 14.

For controlling the current supplied to the electric heating element 13 there is provided a switch 19 comprising movable and stationary contacts 20 and 21 respectively which are connected in series with a source of current and the heating element 13. The movable contact 20 is provided with suitable insulating mounting upon one end of a lever 22, the lever being pivotally mounted as at 23 so as to permit movement of the contact 20 into and out of engagement with contact 21.

For moving the contact 20 to closed position there is provided a pressure responsive device 23 which is inserted between the intake pipe 11 and the tank 10. This pressure or flow responsive device is shown as comprising a piston or plunger 24 operating within a cylinder 26. One end of the cylinder 26 is in communication with the pipe 11 while a port 27 in the cylinder wall establishes communication between the cylinder and pipe or passageway 28 which connects with the lower portion of the tank 10. Upon flow of water through the pipe 11 in response to the opening of faucets connected to the outlet pipe 12 the liquid pressure against the plunger 24 causes it to be moved back to expose the port 27 and thereby establish communication between the pipe 11 and passageway 28 to permit liquid to flow directly into the tank 10. A suitable compression spring 29 may be provided for biasing the plunger 24 towards one end of the cylinder. An auxiliary port 30 may also be provided for permitting escape of liquid entrapped above the cylinder 26 in order to permit it to move freely to expose the port 27.

In order to interconnect the plunger 24 with the movable switch contact 20 there is provided a plunger rod 31 which extends to the exterior of the cylinder 26. The external end 32 of this rod is connected to the switch lever 22 by means of a resilient toggle connection 33 which is connected to the switch lever and rod 31 as by pivotal connections 34 and 35 respectively. The pivotal connections 23, 34 and 35 are arranged so that when the plunger 24 is in its lowered position corresponding to a condition when no flow of liquid is occurring through the system, the connection 35 will be below the dead center position with the result that the resilient toggle 33 will bias the contact 20 to open position. However, upon flow of liquid the plunger 24 is actuated so as to move the pivotal connection 35 above its dead center position and thus cause the toggle 33 to bias the contact 20 towards closed position.

In order to control the opening of the switch 19 so that a desired predetermined quantity of water may be heated, there is provided a thermostat element 36 which preferably extends substantially the entire height of the storage tank 10. The particular type of thermostat element shown comprises a metallic tube 37 having a relatively high temperature coefficient of expansion, the lower end of the tube being fixed to the pipes 28 and 38. The inner or upper end of the tube is sealed and connected to an inner rod 39 made of some suitable material having a relatively low temperature coefficient of expansion such as nickel-iron or nickel-steel alloy of about 35% nickel.

In order to connect the thermostat element with the switch 19 there is provided a latch mechanism which is adapted to be engaged upon movement of the contacts to closed position and to retain the contacts in this position until released by the thermostat element. Thus there is provided a trigger lever 40 which is pivotally mounted as at 41 and is slidably engaged with the outer end of the rod 39. This trigger lever engages a detent 42 which is fixed with respect to the lever 22 so that upon movement of the lever to close the contacts 20 and 21, the trigger latches over the detent. For causing the release of the trigger lever and detent a suitable adjustable connection such as the cam 43 is provided between the lower end of the rod 39 and lever 40. In the construction illustrated the cam 43 is provided with a journal connection 44 to the end of the rod 39 and may be rotated by means of a rod 45 having suitable control means such as a knob 46 fixed to its outer end. Assuming that the mechanism is inclosed by a casing 48 the control rod 45 may project through this casing as shown in Fig. 2 and the casing may be provided with suitable graduations 49 for indicating the relative positions of the cam 43. These graduations for example may read in gallons of liquid to be heated before operation of the thermostat element to release the switch 19.

The operation of the device is made clear by reference to the circuit diagram of Fig. 3. The switch contacts 20 and 21 are connected in series with the heating element 13 and a suitable source of current such as the supply lines 1 and 2. Upon opening a faucet connected with the outlet pipe 12 a flow of water occurs through the intake pipe 11 with the result that the plunger 24 is forced upwardly to permit communication between the pipe 11 and the tank 10. At the same time the toggle connection 33 is moved in such a position that it biases the contacts 20 and 31 to closed position and also causes the detent 42 to engage the trigger 40. As the circuit through the heating element 13 is now closed, hot liquid will begin to be stored within the upper end of the tank 10. Assuming that the control knob 46 has been set for the storage of say one third of a tank of water, the thermostat element 36 will not cause disengagement of the trigger 40 with the detent 42 until substantially this quantity of water has been stored within the tank, after which the trigger is released to permit the contact 20 to be moved to open position. Similarly by adjusting the control knob any given quantity of hot liquid may be maintained within the tank so that a quantity of liquid may be heated consistent with the immediate needs. Since the energization of the heating element is only initiated by flow of water through the system, it is obvious that during long periods when no water is withdrawn the device will cease to operate with a resulting saving in current.

We claim:

1. In a hot liquid supply system, a water tank, a cold water supply pipe connected to said tank whereby the tank is normally filled with water, a hot water pipe communicating with the upper portion of said tank, electrical heating means associated with the tank and adapted to store hot water in the upper portion of the tank by thermal circulation, and means for controlling supplying of current to the heating means in accordance with the amount of stored heated water in the tank.

2. In a hot liquid supply system, a water tank, a cold liquid supply pipe connected to the tank whereby the tank is normally kept filled with water, a hot liquid withdrawal pipe communicating with the upper portion of the pipe, means including an electrical heating element associated with the tank and adapted to store hot liquid in the upper portion of the same by thermal circulation, an electrical switch for controlling current supplied to said element, and an expansible element for controlling said switch, said element being in thermal contact with the liquid within the tank for substantially the entire height of the tank, whereby, said switch may automatically maintain a layer of heated liquid in the upper portion of the tank.

3. In a hot liquid suplpy system, a water tank, a cold liquid supply pipe connected to the tank whereby the tank is normally kept filled with water, a hot liquid withdrawal pipe communicating with the upper portion of the pipe, means including an electrical heating element associated with the tank and adapted to store hot liquid in the upper portion of the same by thermal circulation, an electrical switch for controlling current supplied to said element, an expansible element for controlling said switch, said element being in thermal contact with liquid within the tank and extending substantially the height of the tank, and an adjustable connection between said element and said switch whereby setting of said connection will determine the amount of heated water to be stored in the tank.

4. In a hot liquid supply system, a liquid storage tank adapted to be kept filled with liquid, electrical heating means associated with the tank for storing hot liquid within the same, switch means for controlling the current supplied to said heating means, a thermostat element extending substantially the full height of the tank and in close thermal contact with the liquid within the same, and an adjustable connection between the thermostat element and switch means whereby the device may be set to interrupt the current to the heating means upon storing any desired predetermined quantity of liquid.

5. In a hot liquid supply system, a liquid storage tank adapted to be kept filled with liquid, electrical heating means associated with the tank for storing hot liquid within the same, switch means for controlling the current supplied to said heating means, a thermostat element extending substantially the full height of the tank and in close thermal contact with the liquid within the same, and means including a cam connecting the thermostat element and switch means whereby the device may be set to interrupt the current to the heating means upon storing a predetermined quantity of hot liquid.

6. In a hot liquid supply system, a storage tank adapted to be kept filled with liquid, electrical heating means associated with said tank, means responsive to a flow of water through said system to cause current to be supplied to said heating means, and means for interrupting the current supplied to said heating means comprising a thermostat element extending substantially the full height of the tank and in close thermal contact with the liquid within the same, switch means in the circuit supplying the heating means, and an adjustable connection between the thermostat element and switch means.

7. In a hot liquid supply system, a storage tank adapted to be kept filled with liquid, electrical heating means associated with said tank whereby hot liquid may be stored in the upper portion of said tank, pressure actuated means responsive to flow of liquid through the system to cause current to be supplied to said heating means, and manually controllable means for automatically interrupting the supplying of current to the heating means upon storage of a predetermined quantity of hot liquid in said tank.

In testimony whereof, we have hereunto set our hands.

ARTHUR J. KERCHER.
WILLIAM WESLEY HICKS.